May 6, 1958 B. C. COOK ET AL 2,833,446
FEEDER FOR AUTOMATIC MACHINES
Filed Nov. 1, 1954 7 Sheets-Sheet 3
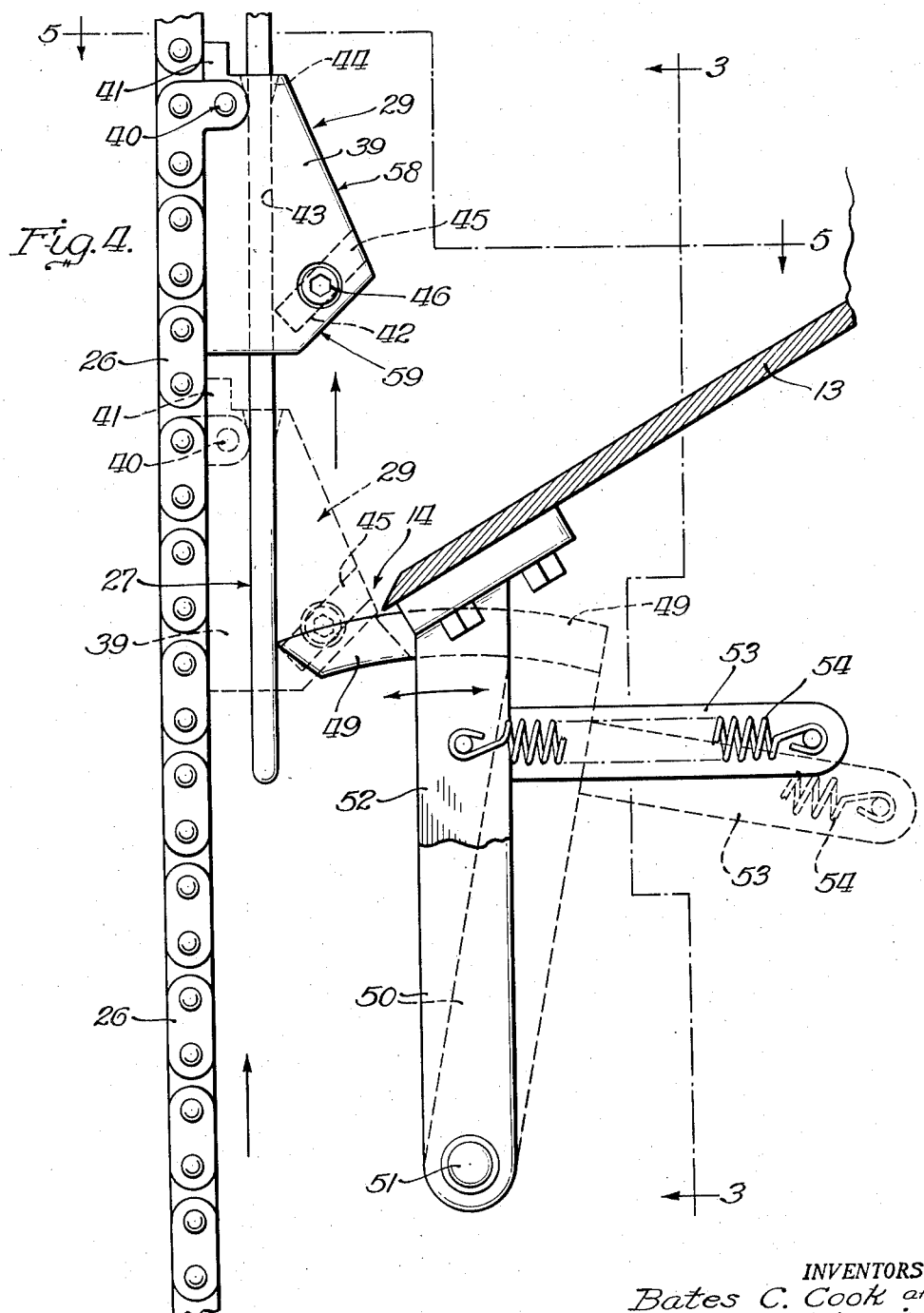
INVENTORS:
Bates C. Cook and
John Jokubonis
By: Brown, Jackson, Boettcher & Dienner
Attys.

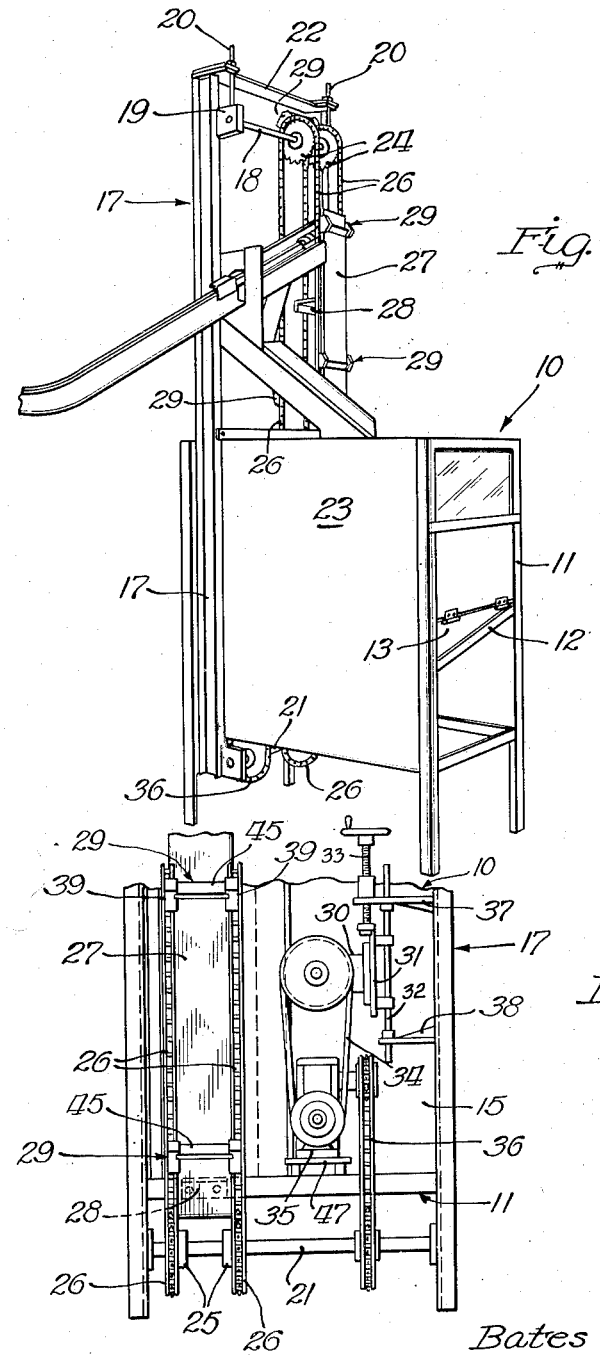

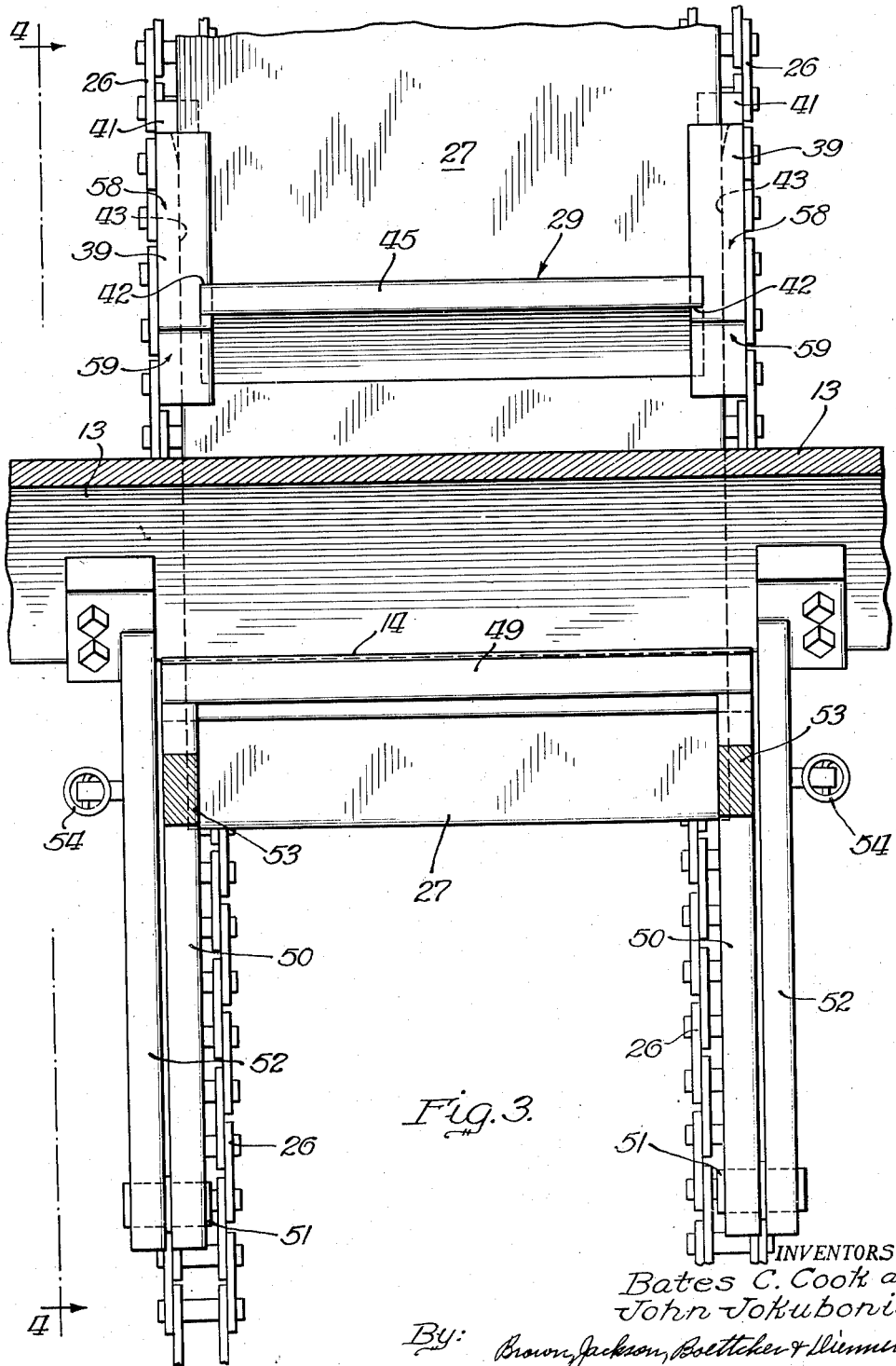

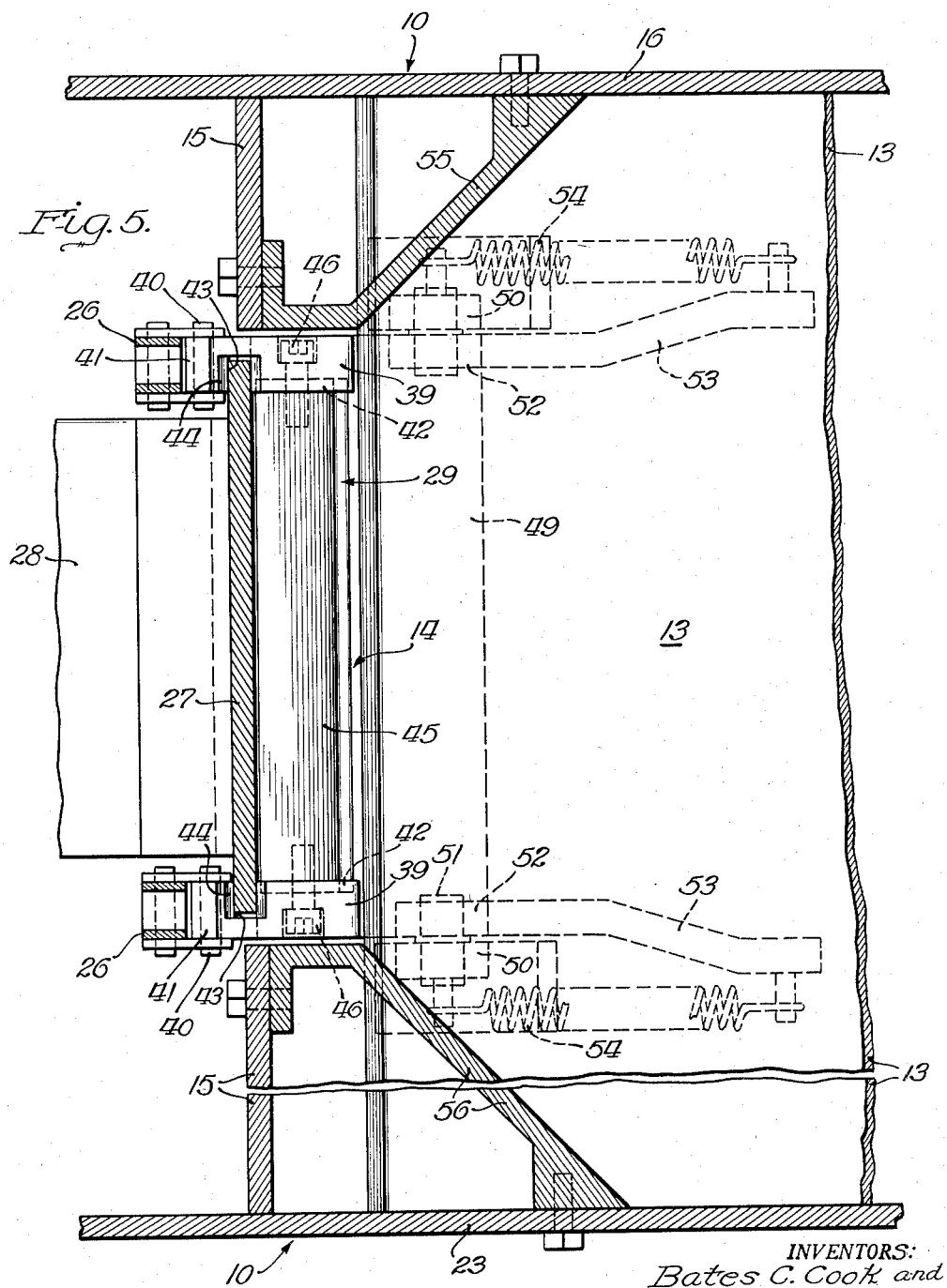

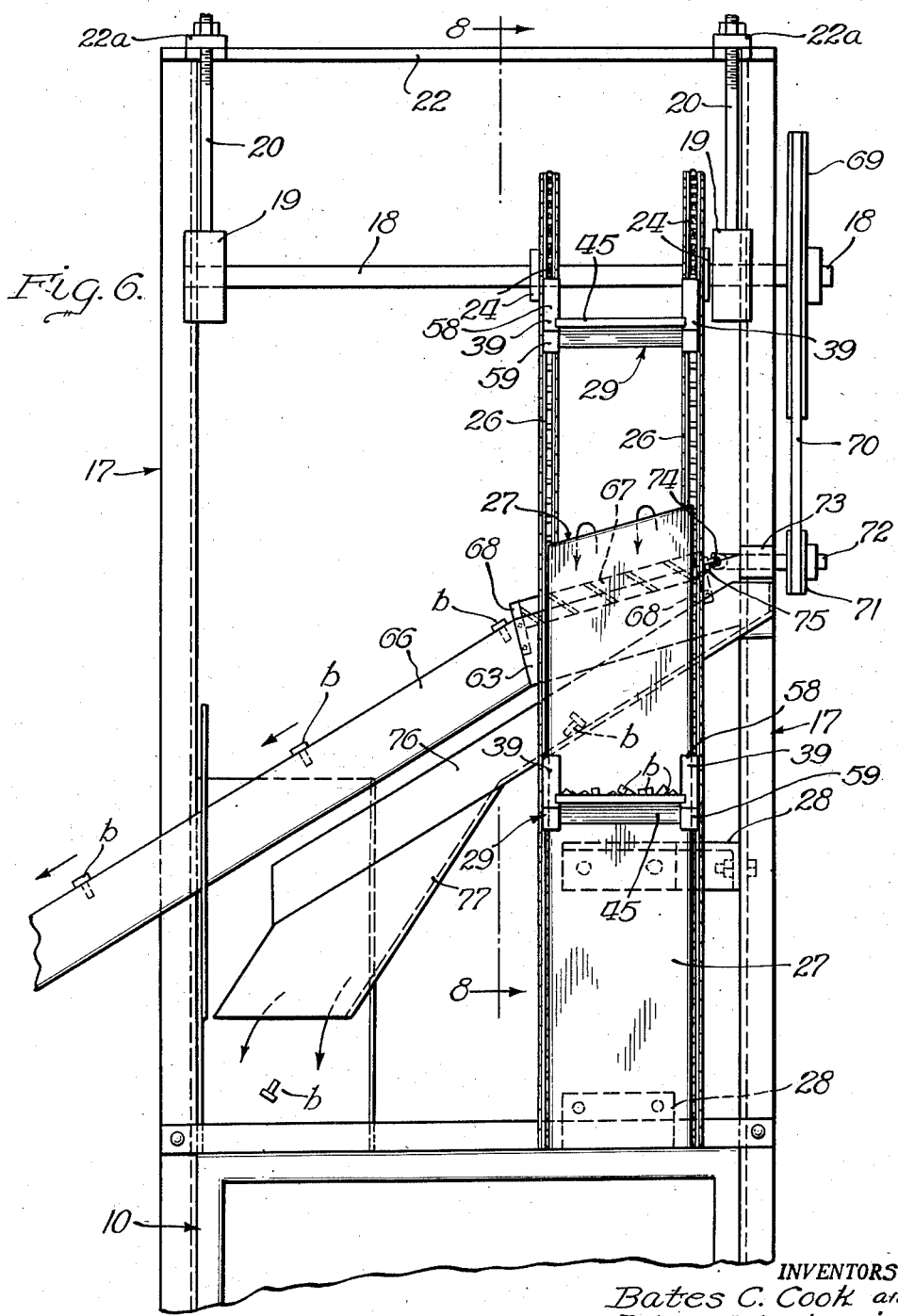

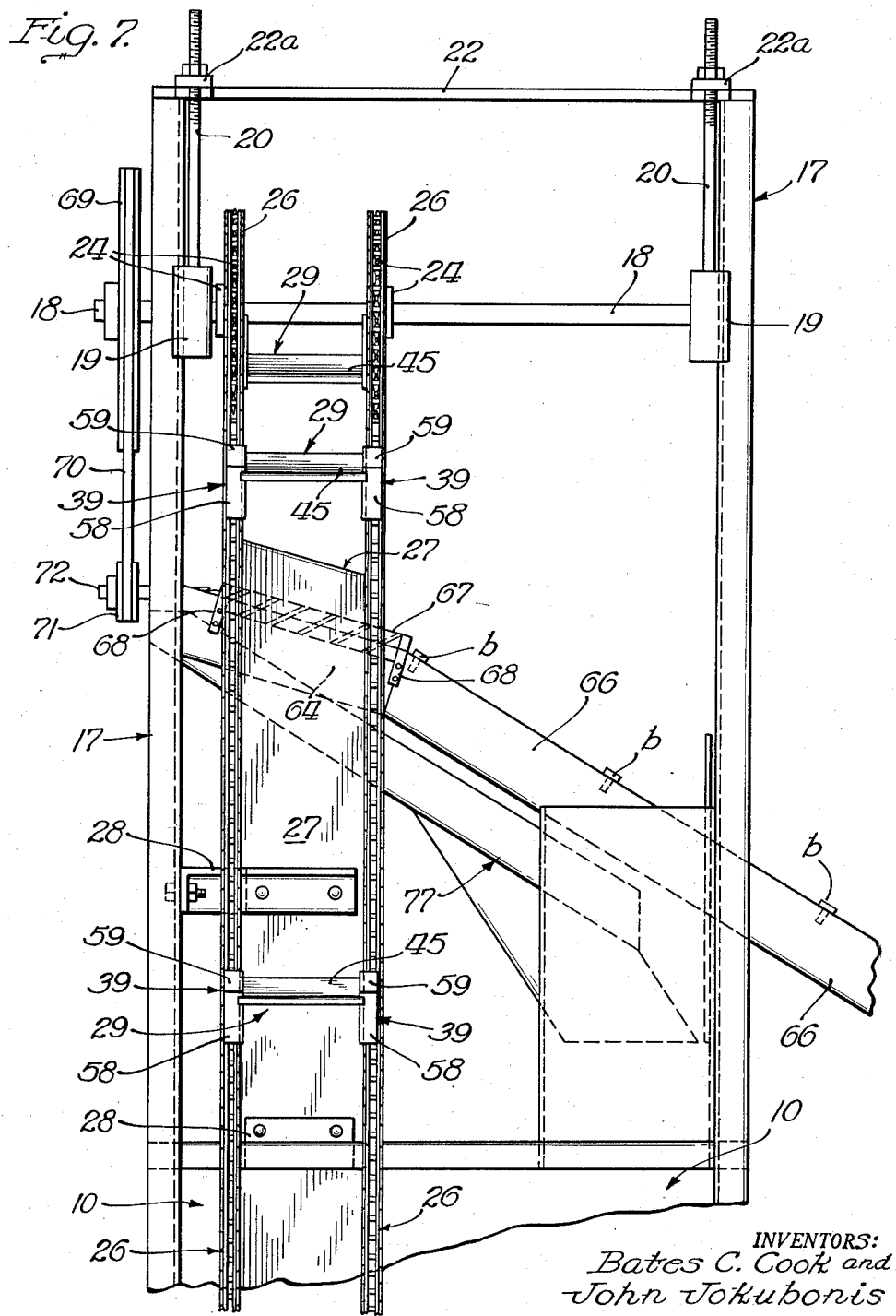

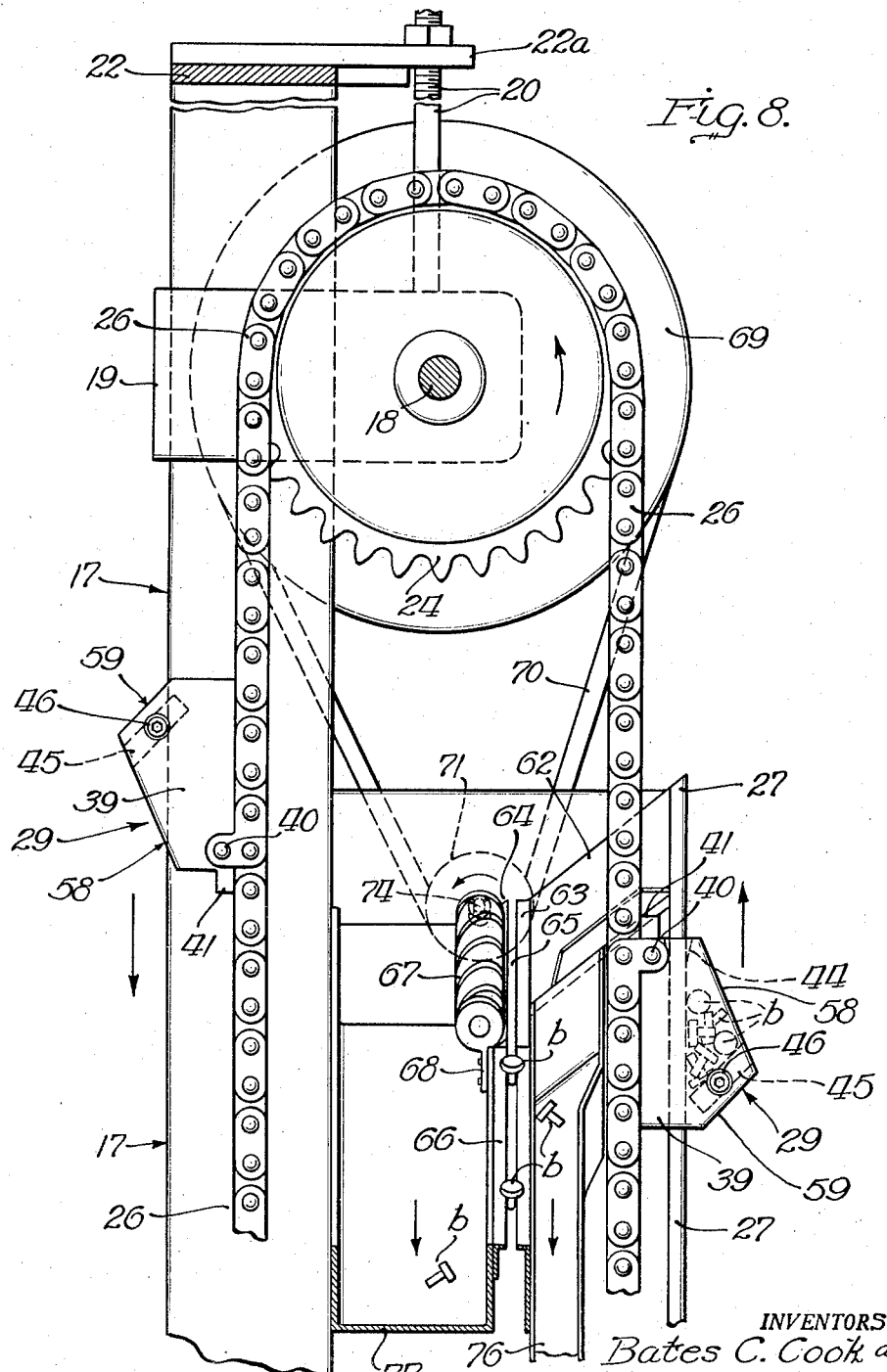

United States Patent Office 2,833,446
Patented May 6, 1958

2,833,446

FEEDER FOR AUTOMATIC MACHINES

Bates C. Cook and John Jokubonis, Chicago, Ill., assignors to Cook & Chick Company, Chicago, Ill., a corporation of Illinois Application November 1, 1954, Serial No. 465,902

5 Claims. (Cl. 222—371)

This invention relates to feeders, and has to do with means for delivering articles, such as work pieces, to automatic machines for performing various operations on such pieces.

It is known to provide feed hoppers and associated means for delivering work pieces to automatic machines. In general, the hoppers used for that purpose are of comparatively small capacity and require frequent replenishing, particularly when used with high speed automatic machines. That limits the number of machines which can be maintained in operation by a single attendant and also incurs the risk of frequent stoppage of the machines, with resultant loss in production, due to exhaustion of the supply of work pieces in the corresponding hoppers.

Our invention is directed to feeder means for automatic machines which avoids the objections to the known feed hoppers above mentioned. To that end we provide a bin of comparatively large capacity and means for delivering work pieces from the bin to a receiving station from which the work pieces are conveyed to an automatic machine as required. The bin has a hopper bottom provided with an opening through which an elevator operates for conveying the pieces to the receiving station. The elevator has a downwardly travelling rear run exterior of the bin and an upwardly travelling front run, and carries flights which pass upwardly through the bottom opening thus assuring that the flights will be loaded or charged with the articles and avoiding necessity of providing agitating means or the like to assure proper charging of the elevator flights. In that connection, the bin preferably has a hopper bottom inclined downward to the opening, further assuring proper charging of the elevator flights. We also provide means guarding against escape of workpieces from the bin through the bottom opening thereof, such means comprising a closure member opened and closed responsive to the passage of the elevator flights upward through the opening. The front run of the elevator, particularly adjacent the bin bottom opening, is restrained against forward and rearward movement, conducive to accuracy of operation of the elevator and of the closure means. The receiving station has means for receiving at one time a predetermined number only of work pieces and may also have means for disposing the work pieces in predetermined arrangement, means being provided for returning to the bin excess work pieces and work pieces not disposed in said predetermined arrangement, if means for so disposing the work pieces is provided. That assures there always being available at the receiving station a full supply of work pieces. In that connection, the large capacity of the bin requires but occasional charging thereof, and the amount of work pieces in the bin at all times during operation may readily be maintained adequate to guard against any risk of lack of supply of work pieces at the receiving station. Further objects and advantages of our invention will appear from the detail description.

In the drawings:

Figure 1 is a perspective view of a feeder embodying our invention;

Figure 2 is a fragmentary rear view of the feeder of Figure 1;

Figure 3 is a fragmentary transverse sectional view, on an enlarged scale, of the bottom wall of the bin, taken substantially on line 3—3 of Figure 4;

Figure 4 is a sectional view taken substantially on line 4—4 of Figure 3, with the lower portion of the gate bracket broken away;

Figure 5 is a sectional view taken substantially on line 5—5 of Figure 4;

Figure 6 is a front view, on an enlarged scale, of the upper portion of the feeder of Figure 1;

Figure 7 is a rear view of the upper portion of the feeder shown in Figure 6, on an enlarged scale relative to Figure 1; and Figure 8 is a sectional view, on an enlarged scale, taken substantially on line 8—8 of Figure 6.

The feeder of our invention comprises a bin 10 of large capacity, having an angle iron frame 11 and a hopper bottom 12 including a bottom wall 13 inclined downward to an elongated rectangular or oblong bottom opening 14. The opening 14 is disposed adjacent back wall 15 and one side wall 16 of bin 10. A channel iron elevator frame 17 of elongated inverted U-shape straddles bin 10 and is secured thereto adjacent the back thereof. Frame 17 extends a substantial distance above bin 10 and carries, adjacent its upper end, a head shaft 18 rotatably mounted in bearing blocks 19 slidably mounted on the sides of frame 17 and adjusted by means of screws 20 passing through plates 22a secured to head bar 22 of frame 17. A lower or tail shaft 21 is rotatably mounted in frame 17 and extends beneath and transversely of bin 10.

Two sprocket wheels 24 are fixed on head shaft 18 in alignment with two sprocket wheels 25 fixed on tail shaft 21 and with the end portions of the bottom opening 14. Sprocket chains 26 pass about each pair of aligned sprocket wheels 24 and 25 and are maintained under appropriate tension by adjustment of the head shaft 18. A guide and backing plate 27 of elongated rectangular or oblong shape is mounted on frame 17 by brackets 28. Plate 27 extends through bottom opening 14 at the back thereof with its lower end spaced a short distance above tail shaft 21 and extends upward within bin 10 to a receiving station, as will be explained more fully later. The chains 26 carry spaced flights 29 constituting therewith an elevator for lifting articles or work pieces in the bin 10 along plate 27 to the receiving station. The elevator may be driven in any suitable manner. Conveniently it is driven by an electric motor 30 mounted on a platform 31 fixed on vertical guide rods 32 slidably mounted through upper and lower brackets 37 and 38, respectively, mounted on a rearward extension of side wall 23 of bin 10. The platform 31 is adjusted by means of a screw 33 attached thereto and having threaded engagement with the upper bracket 37. The motor 30 has driving connection, by V-belt and pulley means 34, to the drive shaft of a speed reducing unit 35 secured on a platform 47 mounted on frame 11. The unit 15 drives the tail shaft 21 through a chain and sprocket drive 36 in such direction that the front or inner run of the elevator travels upward along the inner face of plate 27.

The sprocket wheels 24 and 25 are of appreciable diameter, such that the outer run of the elevator is disposed exteriorly of bin 10, at the outer face of back wall 15 thereof, and the inner run travels upwardly through opening 14 along and parallel with the inner face of plate 27, with chains 26 adjacent the sides of plate 27 and a short distance in rear thereof. The flights 29 respectively comprise two substantially triangular end brackets 39 aligned transversely of the elevator and pivoted adjacent their leading ends—their upper ends at the inner run of the elevator—to the chains 26, at 40, as shown more clearly in Figure 4. Each of the brackets 39 is provided at its upper end with an upwardly extending finger or lug 41 extending along the corresponding chain 26 in close proximity thereto and in cooperation therewith preventing turning over or reversal of bracket 39 as it passes from the front run to the rear run of the elevator. That assures that the flights 29 are maintained in proper relation to the chains 26 and will be properly positioned, at the lower end of the front run of the elevator, for cooperation with plate 27. Each of the brackets 39 is provided in its inner face with a groove 42 extending from its leading edge to its following edge and disposed, at the front run of the elevator, at an inclination downward toward plate 27. Each of the brackets 39 is further provided in its inner face with a groove 43 extending from its leading end to its following end and disposed, at the inner or front run of the elevator, in the plane of plate 27. The leading end of groove 43 is flared at 44, as shown more clearly in Figure 4. The grooves 42 of each pair of brackets 39 snugly receive the end portions of an elongated rectangular or oblong flight bar 45 secured therein by a socket headed screw 46. The lower edge of bar 45 is disposed in proximity to the front face of plate 27 and provides, in cooperation therewith and with the end brackets 39, a flight of substantially V cross section for retaining work pieces and moving them from the bottom wall 13 of bin 10 upward along plate 27.

The opening 14 normally is closed by a gate 49 of arcuate cross section disposed in proximity to the underface of bottom wall 13. Gate 49 is provided at each end thereof with a downwardly extending arm 50 pivoted at its lower end, at 51, to the lower end of a bracket 52 bolted at its upper end to wall 13. Each arm 50 of gate 49 is provided with a forwardly extending finger 53 to the forward end of which is anchored one end of a tension spring 54 the other end of which is anchored to the corresponding bracket 52, as is shown more clearly in Figure 4. The springs 54 urge gate 49 toward plate 27 and normally hold it closed, in contact with the inner or front face of plate 27, thereby closing opening 14 and effectively guarding against escape therethrough of work pieces from the bin 10. Two baffles 55 and 56 (Figure 5) are secured in bin 10 and extend from the side walls 16 and 23, respectively, thereof into close proximity to the chains 26 of the elevator. The baffles 55 and 56 direct the work pieces from the sides of bin 10 to the opening 14 and also prevent escape of the work pieces about the chains 26.

Referring to Figures 3 and 4, each of the flight end brackets 39 has a leading cam surface 58 and a following cam surface 59 which converge away from the corresponding chain 26 and define between them the V-shaped body portion of bracket 39. When a flight of the elevator passes around the lower sprocket wheels 25 and starts upward, the edges of plate 27 enter the grooves 39 and the flight is then restrained by plate 27 against either forward or rearward movement relative to plate 27. In the continued upward travel of the flight, the cam surfaces 58 of brackets 39 contact the rearward edge of gate 49 and cam it open, in opposition to the tension springs 54, to permit passage of the flight through opening 14. As the gate 49 opens the work pieces fall into the space defined by the flight and plate 27 and are carried upward along the latter. When the cam surfaces 58 pass beyond gate 49, in the continued upward travel of the flight, the rearward edge of gate 49 contacts the following cam surfaces 59 which permit closing of gate 49 by tension springs 54, under control of the upwardly travelling flight. That assures smooth opening and closing of gate 49 and avoids objectionable pounding of and damage to the parts, such as would occur if operation of the gate, particularly closing thereof, were not controlled by the flight passing through opening 14.

When the flights of the elevator reach the upper end of plate 27 the work pieces are discharged thereover to a receiving station. It may be assumed, for purposes of description, that the work pieces are bolt blanks having a shank with a head at one end. The blanks $b$ discharged over the upper end of plate 27 are delivered by a chute 62 (Figure 8) to two plates 63 and 64 mounted in back of plate 27 parallel therewith and spaced apart providing therebetween a slot 65 of a width to receive the shanks of the blanks $b$. The plates 63 and 64 are inclined downwardly toward side 23 of bin 10 and slot 65 opens into the upper end of an inclined track 66, of known type, adapted to receive the blanks $b$ from plates 63 and 64 and deliver them to an automatic machine, or to suitable known means for delivering the blanks to an automatic machine. A helically grooved roll 67 is rotatably mounted at the upwardly and forwardly beveled upper portion of plate 64, in brackets 68 secured to the rear face thereof, as shown in Figure 8. Roll 67 extends a substantial distance above plates 63 and 64 and serves as a stop for the blanks discharged from chute 62. A V pulley 69, secured on an extension of head shaft 18, has driving connection by a V belt 70 to a V pulley 71 secured on a stub shaft 72 rotatably mounted in a bearing block 73 secured to the elevator frame 17. The inner end of stub shaft 72 has driving connection, through a universal joint 74, to the outer end of shaft 75 of roll 67. The roll 67 is thus driven in proper direction to urge the blanks $b$ inward along the plates 63 and 64 into parallelism therewith so that the shanks of the blanks will enter the slot 65 and thereafter the blanks will be suspended by their heads as they travel along plates 63 and 64 and into and along the track 66.

The number of blanks which can be accommodated by the plates 63 and 64 is limited by the length of the latter. Blanks delivered to the plates in excess of that number will spill over the forward plate 63, beyond chute 62, and will drop into a chute 76 which returns such excess blanks to the bin 10. Likewise, blanks which are not properly aligned or positioned relative to plates 63 and 64, and which pass beyond chute 62, will drop into the return chute 76, or into a second return chute 77, at the rear of track 66 and merging at its lower portion with chute 76, and be returned to the bin. The elevator is operated at sufficient speed to assure delivery to the receiving station of blanks in amount adequate to meet maximum requirements, which assures uninterrupted operation of the associated automatic machine, so far as the feed thereto of work pieces or blanks is concerned. While we have shown, by way of example, one form of blank receiving and arranging means at the delivery station, any suitable means for receiving the blanks and transferring them to an automatic machine, or any other machine, may be provided within the broader aspects of our invention. The bin 10 preferably is of large capacity such that occasional charging thereof with blanks or work pieces suffices to assure that no shortage of blanks will occur under normal conditions.

It will be understood that changes in detail may be resorted to without departing from the field and scope of our invention, and we intend to include all such variations, as fall within the scope of the appended claims, in this application in which the preferred form only of our invention has been disclosed.

We claim:

1. In a feeder for automatic machines, a bin for work pieces, a receiving station at the upper portion of said bin, the latter having a bottom wall with an opening therethrough, an endless elevator having a front run extending through said opening and upward to said station for delivering work pieces thereto and a rear run exterior of said bin, said elevator having spaced flights of a length approximately the same as that of said opening, a continuous guide plate at the rear of said opening and extending from said bottom wall to said station, said plate being disposed in rear of and in close proximity to said flights of said front run effective for retaining work pieces on said flights during upward travel thereof along said plate, said flights respectively comprising end brackets having grooves receiving the side edges of said plate and in cooperation therewith restraining the respective flights against forward and rearward movement, and a gate yieldingly urged toward said plate and in cooperation therewith normally closing said opening, said end brackets having upper and lower cam surfaces disposed to contact said gate and open it in the passage of a flight upward through said opening and to release said gate gradually for closing under control of said cam surfaces as a flight passes beyond said opening.

2. In a feeder for automatic machines, a bin for work pieces, a receiving station at the upper portion of said bin, the latter having a bottom wall with an opening therethrough, an endless elevator having a front run extending through said opening and upward to said station for delivering work pieces thereto and a rear run exterior of said bin, said elevator having spaced flights of a length approximately the same as that of said opening, a guide plate at the rear of said opening and extending from said bottom wall to said station, said plate being disposed in rear of and in close proximity to said flights of said front run effective for retaining work pieces on said flights during upward travel thereof along said plate, said flights respectively comprising end brackets having grooves receiving the side edges of said plate and in cooperation therewith restraining the respective flights against forward and rearward movement, and a gate yieldingly urged toward said plate and in cooperation therewith normally closing said opening, said end brackets having oppositely inclined upper and lower cam surfaces disposed to contact said gate and open it during passage of a flight upward through said opening and to release said gate gradually for closing under control of said cam surfaces during continued passages of the flight upward beyond said opening.

3. In a feeder for automatic machines, a bin for work pieces, a receiving station at the upper portion of said bin, the latter having a bottom wall with an opening therethrough, an endless elevator having a front run extending through said opening and upward to said station for delivering work pieces there to and a rear run exterior of said bin, said elevator having spaced flights of a length approximately the same as that of said opening, a continuous guide plate at the rear of said opening extending from below said bottom wall upwardly through said opening to said station, said flights respectively comprising end brackets and a flight bar extending therebetween inclined downward toward said plate with its lower edge in proximity thereto, at the front run of said elevator, said plate being effective for retaining work pieces on said flights during upward travel thereof along said plate, said end brackets having grooves receiving the side edges of said plate and in cooperation therewith restraining the respective flights against forward and rearward movement, and a gate yieldingly urged toward said plate and in cooperation therewith normally closing said opening, said end brackets having cam surfaces disposed to contact said gate and open it in the passage of a flight upward through said opening and to release said gate gradually for closing under control of said cam surfaces as a flight passes beyond said opening.

4. In a feeder for automatic machines, a bin for work pieces, a receiving station at the upper portion of said bin, the latter having a bottom wall with an opening therethrough, a continuous guide plate at the rear of said opening extending from below said bottom wall upwardly through said opening to said station, an elevator comprising endless sprocket chains adjacent the sides of said plate providing a front run adjacent the inner face of said plate and a rear run exterior of said bin, flights connecting said chains respectively comprising end brackets and a flight bar extending therebetween and inclined downwardly toward said plate with its lower edge in proximity thereto, at said front run, said end brackets being pivoted at their upper ends to said chains and having grooves in their inner faces snugly receiving the side edges of said plate and flared at their upper ends, at said front run, said end brackets and chains having cooperating means for restraining said end brackets against turning movement relative to said chains in the passage of said flights from said front run to said rear run, and a gate yieldingly urged toward said plate and in cooperation therewith normally closing said opening, said end brackets having cam surfaces disposed to contact said gate and open it in the passage of a flight upward through said opening and to release said gate gradually for closing under control of said cam surfaces as a flight passes beyond said opening.

5. In a feeder for automatic machines, a bin for work pieces, a receiving station at the upper portion of said bin, the latter having a bottom wall with an opening therethrough, a guide plate at the rear of said opening extending from below said bottom wall upwardly through said opening to said station, an elevator comprising endless sprocket chains adjacent the sides of said plate providing a front run adjacent the inner face of said plate and a rear run exterior of said bin, flights connecting said chains respectively comprising end brackets and a flight bar extending therebetween and inclined downwardly toward said plate with its lower edge in proximity thereto, at said front run, said end brackets being pivoted at their upper ends to said chains and having grooves in their inner faces snugly receiving the side edges of said plate and flared at their upper ends, at said front run, said end brackets having lugs extending from their upper ends at said front run and disposed to contact said chains for restaining said end brackets against turning movement relative to said chains in the passage of said flights from said front run to said rear run, and a gate yieldingly urged toward said plate and in cooperation therewith normally closing said opening, said end brackets having cam surfaces disposed to contact said gate and open it in the passage of a flight upward through said opening and to release said gate gradually for closing under control of said cam surfaces as a flight passes beyond said opening.

References Cited in the file of this patent
UNITED STATES PATENTS

| | | |
|---|---|---|
| 13,986 | Hurd | Dec. 25, 1855 |
| 836,129 | McEvers | Nov. 20, 1906 |
| 1,803,993 | Brennan | May 5, 1931 |
| 2,015,892 | Greenlaw | Oct. 1, 1935 |
| 2,516,968 | Faler | Aug. 1, 1950 |
| 2,546,866 | Overly | Mar. 27, 1951 |